(12) United States Patent
Fritsch et al.

(10) Patent No.: US 8,060,554 B2
(45) Date of Patent: Nov. 15, 2011

(54) SYSTEM AND METHOD FOR ENABLING ASYNCHRONOUS PUSH-BASED APPLICATIONS ON A WIRELESS DEVICE

(75) Inventors: Brindusa Fritsch, Toronto (CA); Viera Bibr, Kilbride (CA); Bryan R. Goring, Milton (CA); Michael Shenfield, Richmond Hill (CA)

(73) Assignee: Research In Motion Limited, Waterloo, Ontario (CA)

( * ) Notice: Subject to any disclaimer, the term of this patent is extended or adjusted under 35 U.S.C. 154(b) by 1155 days.

(21) Appl. No.: 11/402,848

(22) Filed: Apr. 13, 2006

(65) Prior Publication Data

US 2007/0011292 A1 Jan. 11, 2007

Related U.S. Application Data

(60) Provisional application No. 60/672,034, filed on Apr. 18, 2005.

(51) Int. Cl.
*G06F 15/16* (2006.01)
(52) U.S. Cl. ...................................................... 709/203
(58) Field of Classification Search ........................ None
See application file for complete search history.

(56) References Cited

U.S. PATENT DOCUMENTS

| | | | |
|---|---|---|---|
| 6,421,781 B1 * | 7/2002 | Fox et al. | 726/4 |
| 6,957,212 B2 * | 10/2005 | Peng | 707/758 |
| 7,177,859 B2 * | 2/2007 | Pather et al. | 707/3 |
| 2002/0024536 A1 * | 2/2002 | Kahan et al. | 345/745 |
| 2003/0022657 A1 * | 1/2003 | Herschberg et al. | 455/414 |
| 2003/0060896 A9 * | 3/2003 | Hulai et al. | 700/1 |
| 2003/0095540 A1 | 5/2003 | Mulligan et al. | |
| 2004/0045005 A1 * | 3/2004 | Karakashian | 719/310 |
| 2005/0063335 A1 | 3/2005 | Shenfield et al. | |
| 2005/0193135 A1 * | 9/2005 | Owen et al. | 709/230 |
| 2005/0198304 A1 * | 9/2005 | Oliver et al. | 709/227 |
| 2005/0266836 A1 * | 12/2005 | Shan | 455/417 |

(Continued)

FOREIGN PATENT DOCUMENTS

| | | |
|---|---|---|
| EP | 1126681 | 8/2001 |
| WO | WO 02/103967 | 12/2002 |
| WO | WO 2004/107216 A | 12/2004 |

OTHER PUBLICATIONS

T. Pilioura et al.; Scenarios of using Web Services in M-Commerce; Jan. 2003; vol. 3, No. 4, ACM SIGecom Exchanges, p. 28-36.*

(Continued)

*Primary Examiner* — Ario Etienne
*Assistant Examiner* — Clayton R Williams
(74) *Attorney, Agent, or Firm* — Gowling Lafleur Henderson LLP

(57) ABSTRACT

There is provided a system and method of enabling asynchronous push-based applications on a wireless device in a system having an application gateway server including an application repository and a server proxy including an event sink for communicating between the system and the device. The method comprises reading a Web service interface, generating a Web service interface therefrom conforming to a notification protocol, creating a notification-based application bundle for the Web service, publishing the notification-based application bundle, creating an event source. The system comprises an application gateway server, an application repository and an application registry. The application gateway includes an event sink for communicating between the system and the device. The application gateway server is configured for communication with a backend server including an event source.

10 Claims, 7 Drawing Sheets

U.S. PATENT DOCUMENTS

2006/0023674 A1 2/2006 Goring et al.
2006/0036941 A1 2/2006 Neil
2006/0039401 A1 2/2006 Shenfield et al.
2006/0206559 A1* 9/2006 Xie et al. .................. 709/201

OTHER PUBLICATIONS

PCT International Search Report and Written Opinion mailed Jun. 22, 2006 for corresponding PCT Application No. PCT/CA2006/000570.

IBM et al "Web Services Eventing Ws-Eventing" Aug. 1, 2004.

Prodan R Et al "A web service-based experiment managment system for the grid" Apr. 22, 2003 pp. 85-94 figure 1.

Bannon M R Et al "Semantic Web Data Description and Discovery" Sep. 19, 2003 figure 1.

Tung Bui Et al "Web Services for Negotiation and Bargaining in Electronic Markets" Jan. 3, 2005.

* cited by examiner ically, it is desirable to pinpoint notification components such as event sources, notification messages, subscription criteria, etc. in an application design. The design may then be used to generate a bundle that is downloaded and installed on the device to make the application 'notification-aware'.

SYSTEM AND METHOD FOR ENABLING ASYNCHRONOUS PUSH-BASED APPLICATIONS ON A WIRELESS DEVICE

This non-provisional application claims the benefit of U.S. Provisional Application No. 60/672,034 filed on Apr. 18, 2005, which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The present patent disclosure relates generally to a communication system for providing communication with a plurality of wireless devices and specifically to a system and method for enabling asynchronous push-based applications on such devices.

BACKGROUND OF THE INVENTION

Due to the proliferation of wireless networks, there are a continually increasing number of wireless devices in use today. These devices include mobile telephones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web Services through Internet-based browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of browsers is that the screens are rendered at runtime, which can be resource intensive. Applications for browsers are efficient tools for designing platform independent applications. Accordingly, different runtime environments, regardless of the platform, execute the same application. However, since difference wireless devices have different capabilities and form factors, the application may not be executed or displayed as desired. Further, browser based application often require significant transfer bandwidth to operate efficiently, which may be costly or even unavailable for some wireless devices.

Current push applications available for mobile devices are proprietary implementations that have not been constructed using a standard specification for the subscription/notification model. Currently there is no known framework to build a mobile application generically, describe it as a 'notification enabled' application by pinpointing the notification components and put it in a context from which it can be available to the device for download and point and click execution.

Systems and methods disclosed herein provide a communication system for enabling asynchronous push-based applications on wireless devices to obviate or mitigate at least some of the aforementioned disadvantages.

BRIEF DESCRIPTION OF THE DRAWINGS

An embodiment of the patent disclosure will now be described by way of example only with reference to the following drawings in which.

DETAILED DESCRIPTION OF THE PREFERRED EMBODIMENT

Figure 1:
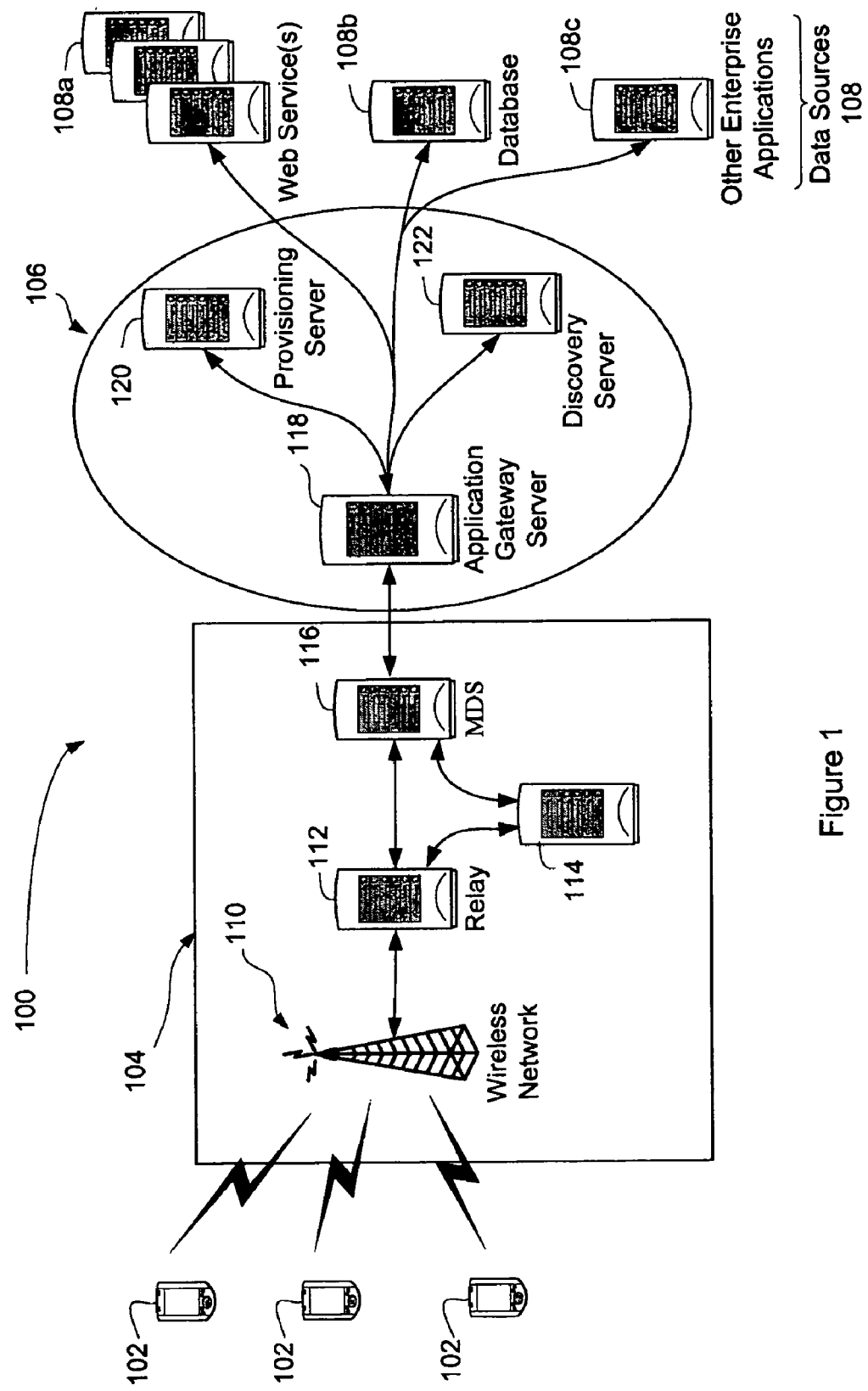
FIG. 1 is block diagram of a network facilitating wireless component applications.

In accordance with an embodiment of the present patent disclosure there is provided a system for enabling asynchronous push-based applications on a wireless device. The system comprises an application gateway server including an event sink for communicating between the system and the device, an application registry and an application repository. The application gateway server is configured for communication with a backend server via an event source.

In accordance with another embodiment of the present patent disclosure there is provided a method of enabling the execution of asynchronous push-based applications on a wireless device in a system having an application registry, an application repository and an application gateway server including an event sink for communicating between the system and the device. The method comprises the steps of reading a Web service interface, generating a Web service interface therefrom conforming to a notification protocol, creating a notification-based application bundle for the Web service, publishing the notification-based application bundle and creating an event source.

In accordance with another embodiment of the present patent disclosure there is provided a computer-readable medium storing instructions or statements for use in the execution in a computer of a method of enabling the execution of asynchronous push-based applications on a wireless device. The method comprises the steps of reading a Web service interface, generating a Web service interface therefrom conforming to a notification protocol, creating a notification-based application bundle for the Web service, publishing the notification-based application bundle and creating an event source.

In accordance with another embodiment of the present patent disclosure there is provided a propagated signal carrier carrying signals containing computer-executable instructions that can be read and executed by a computer. The computer-executable instructions are used to execute a method of enabling the execution of asynchronous push-based applications on a wireless device. The method comprises the steps of reading a Web service interface, generating a Web service interface therefrom conforming to a notification protocol, creating a notification-based application bundle for the Web service, publishing the notification-based application bundle and creating an event source.

In the wireless device world, where resources are scarce and connectivity is intermittent, the user experience is best when information is 'pushed' to the user's device. The user does not experience network latency since the user is not actively requesting the information, but rather the information is pushed to him as soon as it is available. Applications that are suitable for push deliver dynamic data, information that is valuable in real-time (examples include email, messaging, weather, news, stock quotes, sports events, and schedules).

Accordingly the present patent disclosure provides an efficient solution for enabling push-based applications to execute in a mobile environment while conforming to specific notification protocols. Conveniently, specific flows are exemplified for the WS-Eventing standard, but they can apply to any protocol that provides means for applications to subscribe to topics of information and receive updates based upon dynamic changes in the underlying data.

Advantageously, the method of the present embodiment takes advantage of the asynchronous, push-based architecture of a runtime environment running XML-based applications on a mobile device 106. As a consequence, the method does not require the runtime environment to be aware of the 'notification-based' nature of certain applications it is running. From the point of view of runtime environment (RE), all applications are asynchronous and disconnected.

For convenience, like numerals in the description refer to like structures in the drawings. Referring to FIG. 1, a communication infrastructure is illustrated generally by numeral 100. The communication infrastructure 100 comprises a plurality of wireless devices 102, a communication network 104, an application gateway 106, and a plurality of backend services 108.

The wireless devices 102 are typically personal digital assistants (PDAs), such as a BlackBerry™ by Research in Motion for example, but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML). The component applications can further comprise workflow components which contain a series of instructions such as written in a subset of ECMAScript, and can be embedded in the XML in some implementations. Therefore, since the applications are compartmentalized, a common application can be written for multiple devices by providing corresponding presentation components without having to rewrite the other components. Further, large portions of the responsibility of typical applications are transferred to the runtime environment for the component application. The details of the component applications are described at the end of this description.

The wireless devices 102 are in communication with the application gateway 106 via the communication network 104. Accordingly, the communication network 104 may include several components such as a wireless network 110, a relay 112, a corporate server 114 and/or a mobile data server 116 for relaying data between the wireless devices 102 and the application gateway 106.

The application gateway 106 comprises a gateway server 118 a provisioning server 120 and a discovery server 122. The gateway server 118 acts as a message broker between the runtime environment on the wireless devices 102 and the backend servers 108. The gateway server 118 is in communication with both the provisioning server 120 and the discovery server 122. The gateway server 110 is further in communication with a plurality of the backend servers 108, such as Web services 108a, database services 108b, as well as other enterprise services 108c, via a suitable link. For example, the gateway server 110 is connected with the Web services 108a and database services 108b via Simple Object Access Protocol (SOAP) and Java Database Connectivity (JDBC) respectively. Other types of backend servers 108 and their corresponding links will be apparent to a person of ordinary skill in the art.

Each wireless device 102 is initially provisioned with a service book establishing various protocols and settings, including connectivity information for the corporate server 114 and/or the mobile data server (MDS) 116. These parameters may include a Uniform Resource Locator (URL) for the application gateway server 118 as well as its encryption key.

Alternately, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
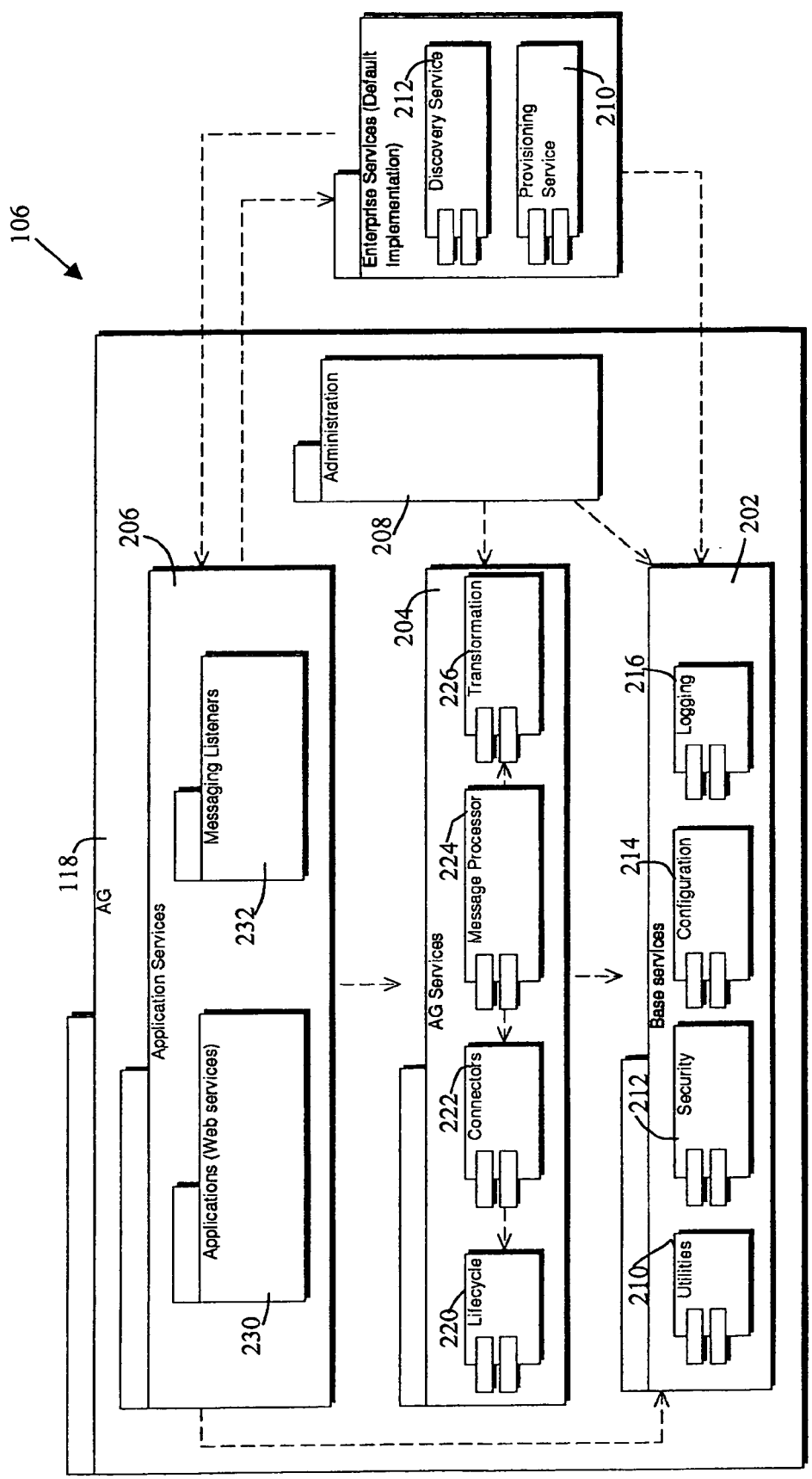
FIG. 2 is a detailed block diagram of the application gateway shown in FIG. 1.

Referring to FIG. 2, a more detailed view of the application gateway 106 is shown. The application gateway server 118 includes three layers of service; a base services layer 202, an application gateway services layer 204 and an application services layer 206. The application gateway server 118 further includes an administration service 208.

The provisioning server 120 and discovery server 122 provide a provisioning service 210 and a discovery service 212, respectively.

At the lowest level, the base services layer 202 offers basic, domain independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a lifecycle application, a packaging application and a message listening application provide external program interfaces since they communicate primarily with applications on external systems. Similarly, an administration application provides a user interface by providing a user with ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application provides an interface for receiving messages from the wireless devices 102 as well as external sources and forwarding them to the messaging subsystem. Further, the message listening application typically authenticates that the source of the message is valid.

The security subsystem 212 providing services used by other subsystems for securing communications with the wireless device 102. In order to facilitate secure communications, the security subsystem 212 encrypts and decrypts messages, validates signatures and signs messages.

Figure 3:
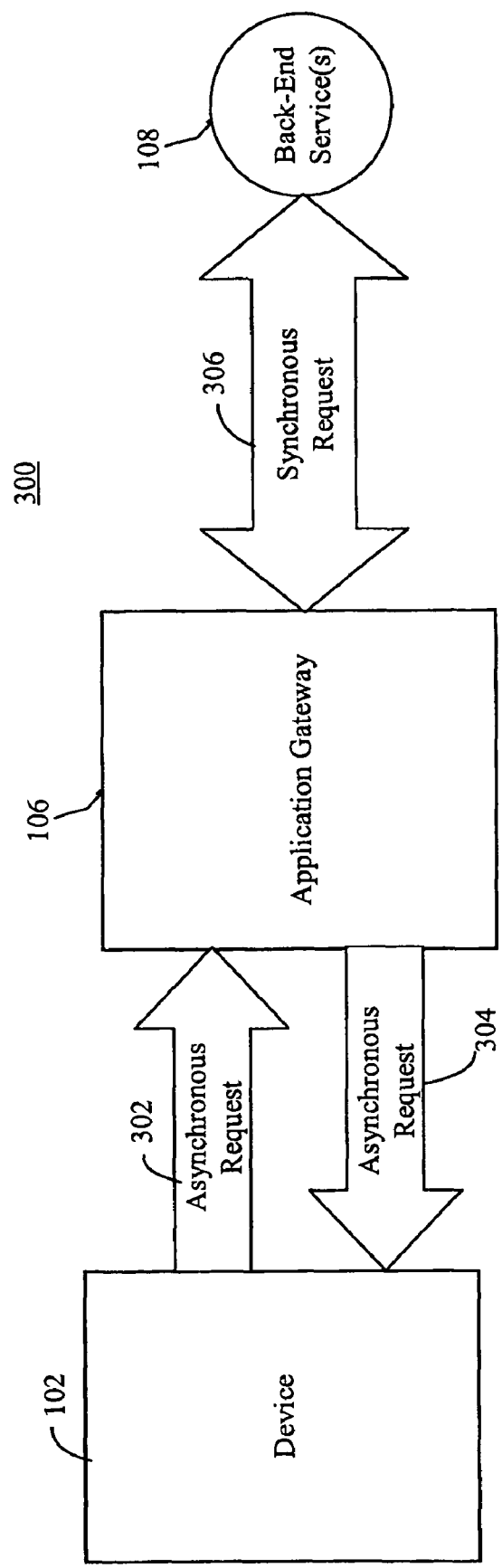
FIG. 3 is a block diagram of a wireless component application communication model.

Referring to FIG. 3 there is illustrated in a block diagram a wireless component application communication model. From a high-level perspective, the overall wireless component application infrastructure 300 includes a wireless component application runtime environment (Device RE) running on the device 102 and a wireless component application gateway (AG) 106 running on the server 118.

The Application Gateway (AG) 106 serves as a mediator between a wireless component application executed by RE 102 and a one or more back-end systems 108 with which the wireless component application communicates. In most cases the back-end system(s) 108 is expected to be a Web service using SOAP over HTTP or HTTPS as transport protocol.

The term Web service is used interchangeable with backend throughout this document since Web services are the most common expected back-end systems. The wireless component application communication model 300 is based upon asynchronous messaging paradigm. In this model the application gateway (AG) 106 establishes and mediates the connection between the device 102 and the back-end system(s) 108 to:

1. Achieve greater flexibility in resource management.
2. Provide reliable communication link between device 102 and back-end system 106 to handle situations when wireless coverage is unstable.
3. Efficiently distribute workload between device RE 102 and AG 106.

Figure 4:
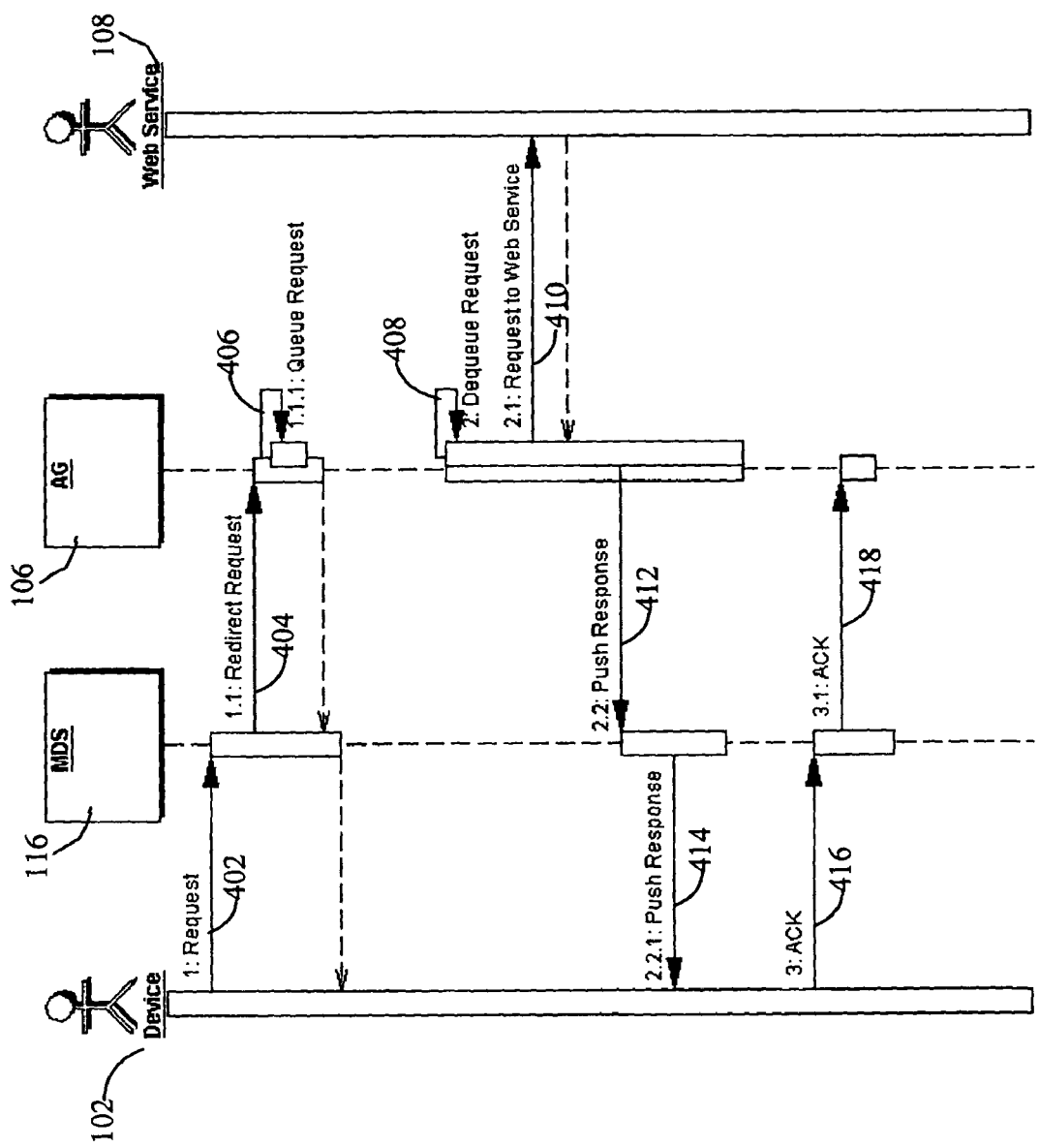
FIG. 4 is a sequence diagram of a communication sequence for the wireless component application communication model of FIG. 3.

Referring to FIG. 4 there is illustrated in a flow diagram of a communication sequence for the wireless component application communication model of FIG. 3. The diagram describes the communications sequence between the device 102 and the back-end system(s) 108:

Upon receiving a request 402 from the device 102, via 404 MDS 116, AG 106 queues the request 406 and releases the connection to the device.

Next, the request is retrieved from the queue 408, preprocessed and forwarded 410 to the Web Service 108 through a synchronous communication channel.

Any response from the previous request is processed by AG 106 and a response message is sent asynchronously 412 and 414 back to the device.

Figure 5A:
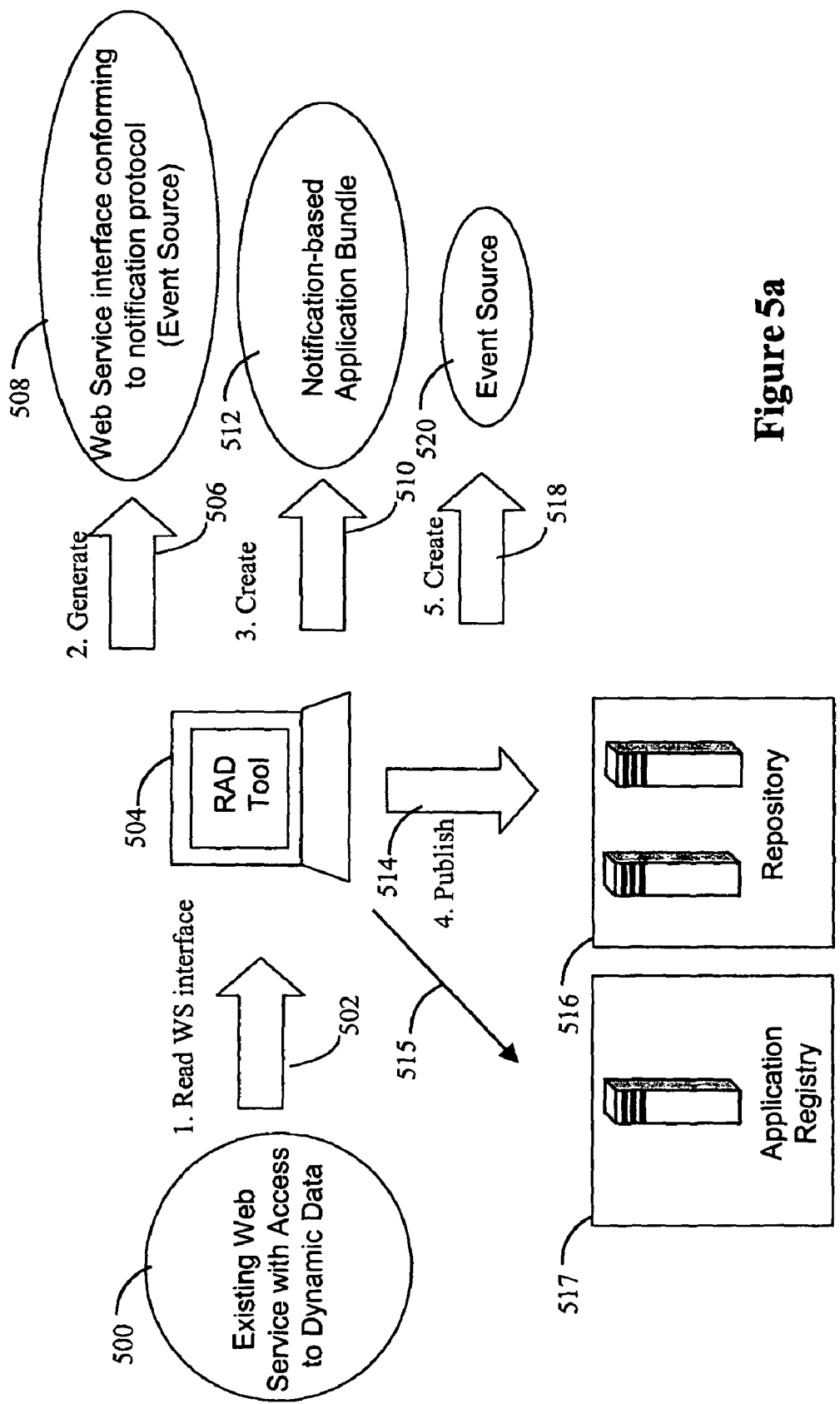
FIG. 5a and 5b are block diagrams of a network as shown in FIG. 1 for enabling asynchronous push-based applications on wireless devices in accordance with an embodiment of the present patent disclosure.
Figure 5B:
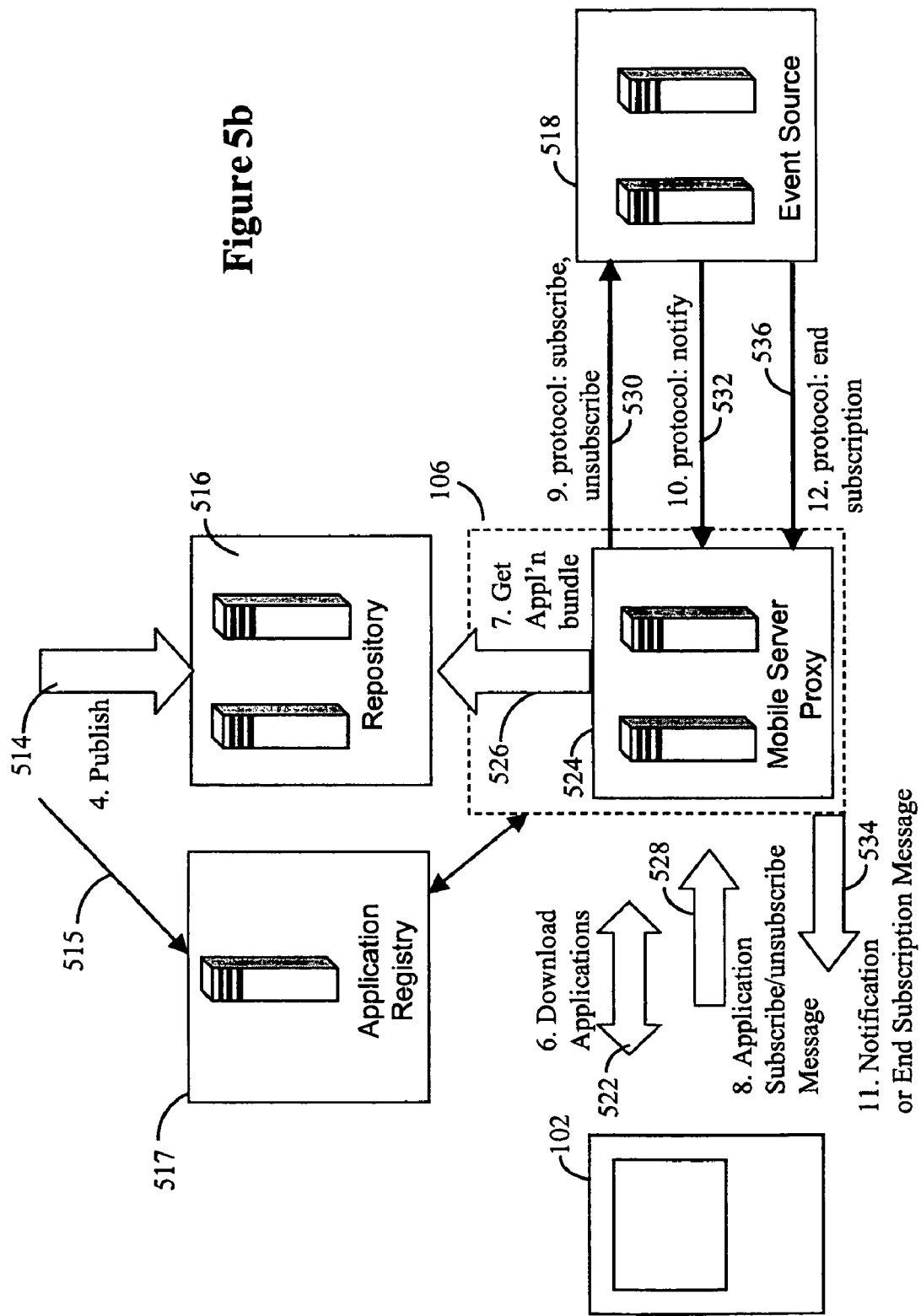

Referring to FIG. 5a and 5b there are illustrated in block diagrams of a network as shown in FIG. 1 for enabling asynchronous push-based applications on wireless devices in accordance with an embodiment of the present patent disclosure. In FIG. 5a, at Step 1, an existing Web service 500 has its Web service interface read 502 by a user of a (rapid application development) RAD tool 504. Then, at Step 2, the RAD tool user 504 generates 506 a Web service interface 508 conforming to a notification protocol. At Step 3, the RAD tool user 504 creates 510 a notification-based application bundle 512, then at Step 4 publishes 514 the notification-based application bundle 512 to a repository 516 in the application gateway 106. At the same time it publishes 515 a registry entry in a registry 517, the registry entry refers to the application bundle and where it is located. At Step 5 the RAD tool user 504 may implement 518 an event source 520 if one does not exist. If the mobile application developer (RAD user) has update rights to the backend server that has the data and is to act as the event source 520, the event source is implemented according to the protocol supported by the application gateway. Otherwise, a proxy is created on the application gateway to implement the required subscription/notification protocol. In this implementation of event source 520, the backend infrastructure is polled for data and to detect data changes and triggers notifications when changes are found.

In FIG. 5b, at Step 6, the mobile device 102 initiates an application download 522 from the application gateway 106. At Step 7, a mobile proxy server 524 gets 526 the notification-based application bundle 512 from the repository 516 in the application gateway 106. At Step 8, the mobile device 102 generates 528 an application subscribe message for mobile server proxy 524. At Step 9, the mobile server proxy 524 sends a protocol: unsubscribe 530 to the event source 520. Subsequently, at Step 10, the event source 520 sends a protocol: notify 532 to the mobile server proxy 524. At Step 11, the mobile server proxy 524 sends 534 a notification message to the mobile device 102.

When the mobile device 102 no longer wants to use the service it un-subscribes at Step 8, the mobile device 102 generates 528 an application un-subscribe message for mobile server proxy 524. At Step 9, the mobile server proxy 524 sends a protocol: unsubscribe 530 to the event source 520. At Step 12, the event source 520 sends a protocol: end subscription 536 to the mobile server proxy 524. Subsequently, at Step 11, the mobile server proxy 524 sends 534 a subscription end message to the mobile device 102.

The following definitions are used with the detailed description:

Notification message carrying data of interest to a specific user

Subscription message denoting an event originated by a user that expresses his interest to be notified when specific events occur RAD Tool for Mobile Applications tool used by a developer to create a mobile application, bundle it and publish it (make it available for download)

Server Proxy server enabling a mobile application to communicate with backend application servers and have access to data Notification-Based Application Bundle XML application built with RAD tools that has been built for a framework that supports a notification protocol (for example, WS-Eventing). The application is accompanied by additional information to help the mobile framework map the application messages to notification protocol components.

WS-Eventing Web Services Eventing standard for notification based Web Services (ftp://www6.software.ibm.com/software/developer/library/ws-eventing/WS-Eventing.pdf)

Figure 6:
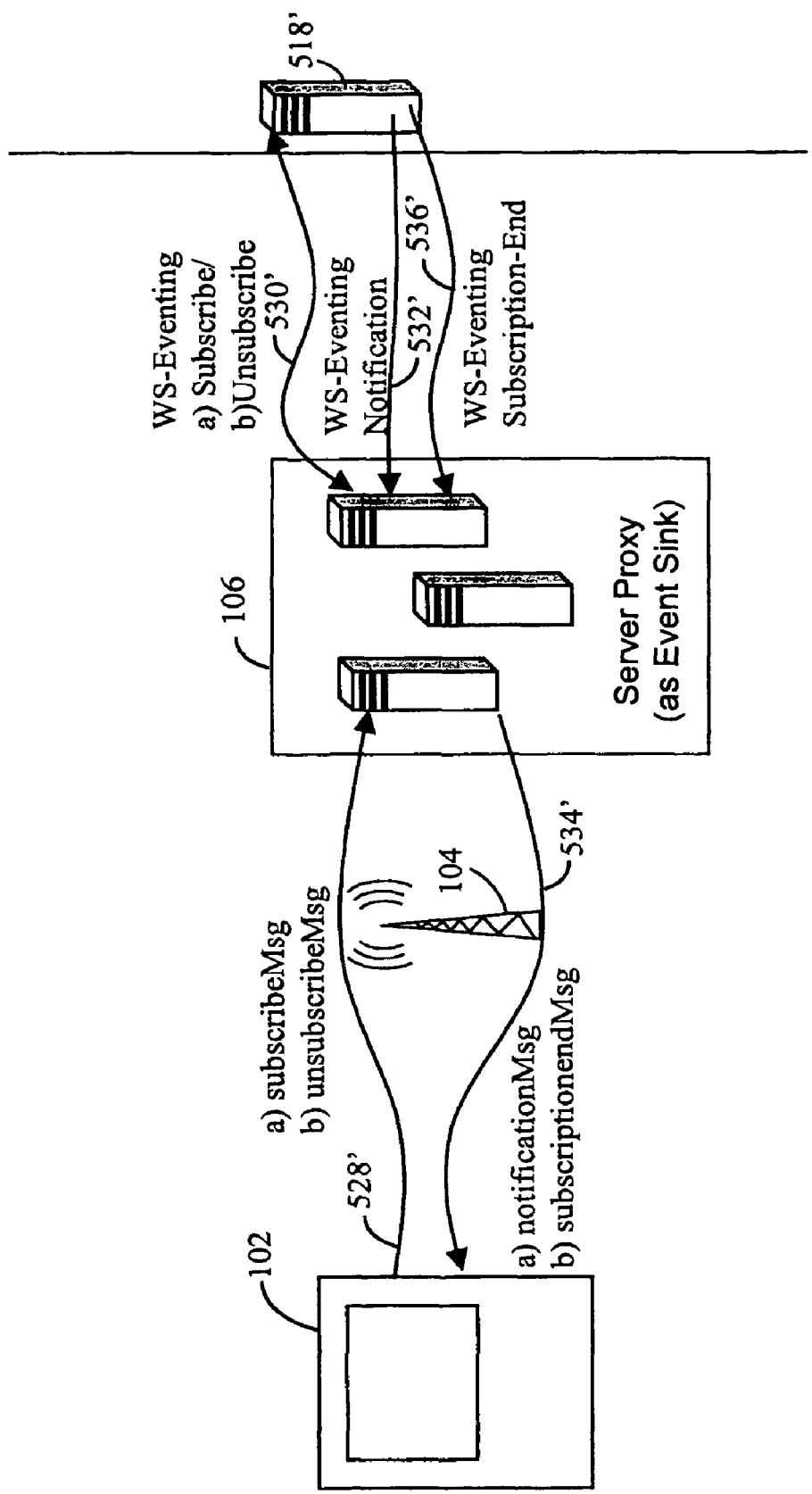
FIG. 6 is a block diagram of a network as shown in FIG. 1 executing a notification-based application in accordance with an embodiment of the present patent disclosure.

Event Source Backend Server accepting subscriptions, delivering notifications based on them and terminating subscriptions Event Sink Server accepting notifications from Event Source NotificationURL the location (URL) where the notification message should be sent SubscriptionEnd message originated by Event Source denoting the subscription has been terminated SubscriptionEnd URL the location where the Subscription-End message should be sent Filter expression that describes the type of data the user is interested in; it may have any format as long as the Event Sink and the Event Source both understand it Referring to FIG. 6 there is illustrated in a block diagram, a network as shown in FIG. 1 executing a notification based application in accordance with an embodiment of the present patent disclosure. FIG. 6 shows a WS-Eventing implementation of the embodiment of FIG. 5b.

In FIG. 6, the mobile device 102 generates 528' a) subscribeMsg for mobile server proxy 524. The mobile server proxy 524 sends a WS-Eventing a) subscribe 530' to the WS-Eventing event source 520'. Subsequently, the event source 520 sends a WS-Eventing Notification 532' to the mobile server proxy 524. The mobile server proxy 524 sends 534' a) notificationMsg to the mobile device 102.

When the mobile device 102 no longer wants to use the service it un-subscribes by generating 528' b) an unsubscribeMsg message for mobile server proxy 524. T mobile server proxy 524 sends b) a WS-Eventing Unsubscribe 530' to the WS-Eventing event source 520.

The event source 520 has the ability to end a subscription for any reason. It can do that by sending a Subscription End 536' to the mobile server proxy 524. The mobile server proxy 524 sends 534' b) subscriptionEndMsg to the mobile device 102. The mobile server proxy 524 is aware of the subscription component of certain applications and removes this information upon reception of subscriptionEnd.

For example: An AEventsNotification application can be created as a notification application by a development tool based on an initial interface of a regular Web Service WS1 retrieving (preferably dynamic, changing) data of type A from a backend.

The RAD tool reverses this pull interface, creating a push-based application and back-end by adding protocol specific artifacts to both the mobile application and backend 108.

The table below illustrates how the responsibilities for executing a notification-based mobile application are divided among the three actors, the mobile application, the proxy server and the backend.

TABLE A

| No | Mobile Application (notification consumer) | Mobile Server Proxy acting as Event Sink | Event Source Backend (notification producer) |
|---|---|---|---|
| 1 | a. outSubscriptionForAMsg | b. Detect subscription, use protocol and send to identified event source | c. protocol: subscribe (API) |
| 2 | a. outDeleteSubscriptionForAMsg | b. Same as above for unsubscribe | c. protocol: unsubscribe/pause/resume (API) |
| 3 | c. inNotifyNewAMsg | b. protocol: notify | a. Use protocol and Event Sink notification location to send notifications |
| 4 | inDeleteSubscriptionForAMsg | protocol: subscriptionEnd | Use protocol and Event Sink subscriptionEnd location to send subscriptionEnd |

TABLE B

Subscribe Use Case

| No | Mobile Application | Proxy Server | Event Source |
|---|---|---|---|
| 1 | Send outSubscriptionForAMsg containing subscriptionType (identified by message name itself) name expiry date f1 f2 . . . fn where f1, f2, ... fn are fields that make up the subscription filter | 2. Map mobile message to protocol subscription Uses meta-information to detect subscription; Optionally keep subscription type/name & filter; Use meta-information to retrieve protocol and other connection information to invoke Event Source subscription Generate unique internal subscription ID Send subscribe msg to backend 4. Retrieve and persist external subscription ID or any information returned (reserved for subsequent Event Source protocol re-invocations) | 3. Receive subscription persist subscription information, including unique ID from received filter generate own external ID for subscription return back to caller the external subscription ID (also called "cancellation ID") |

TABLE C

Unsubscribe Use Case

| No | Mobile Application | Proxy Server | Event Source |
|---|---|---|---|
| 1 | Send outDeleteSubscriptionForAMsg containing subscriptionType (identified by message name itself) name | 2. Map mobile message to protocol subscription Uses meta-information to detect un-subscribe; Find subscription by type and name, retrieve external ID ("cancellation ID"). Use meta-information to retrieve protocol and other connection information to invoke Event Source subscription Send unsubscribe Msg to backend Remove subscription | 3. Receive unsubscribe message Remove it Stop sending notifications related to this subscription |

TABLE D

Notify Use Case

| No | Mobile Application | Proxy Server | Event Source |
|---|---|---|---|
| | | 2. Retrieve subscription by internal ID retrieve subscription type and name construct wireless notification message containing correct name and data of type A retrieve subscriber information (mobile device) information | 1. Subscription criteria is met due to data changes caused by external events use received subscription ID add data of type A to message send notification based on supported protocol |

TABLE D-continued

Notify Use Case

| No | Mobile Application | Proxy Server | Event Source |
|---|---|---|---|
| | | from stored subscription information, send message inNotifyNewAMsg | |
| | 2. Receive notification for A create/update/display or discard A (this behavior is part of the application logic, as the RE deals with this application as with all others) | | |

TABLE E

End subscription Use Case (by Event Source)

| No | Mobile Application | Proxy Server | Event Source |
|---|---|---|---|
| | | | 1. Subscription criteria or other events invalidate the subscription get subscription ID send subscriptionEnd using protocol |
| | | 2. retrieve subscription information retrieve mobile device ID send inDeleteSubscriptionForAMsg containing subscription name | |
| | 3. Application logic should remove the subscription on reception of this device (the RE does not enforce it, although the RAD tool may) | | |

Application A example:

```
<?xml version="1.0" encoding="iso-8859-1"?>
<!DOCTYPE mobileApp SYSTEM "mobileApp-1_0.dtd">
<app uri="ww.company.com/nGen" name="nGen" size="3.4.2.772"
entry="SendSubscriptionScreen"
vendor="Company" version="1.1.22" >
<data name="NotificationA" persist="true" key="name">
<field name="name" type="string" array="false"/>
<field name="someData" type="string" array="false"/>
</data>
<data name="NotificationFilterForA" persist="true" key="ID">
<fieldname="ID" type="string" array="false"/>
<field name="name" type="string" array="false"/>
<field name="timeInterval" type="string" array="false"/>
<field name="numANotifications" type="string" array="false"/>
<field name="subscribeDate" type="date" array="false"/>
<field name="Expires" type="string" array="false"/>
</data>
<message name="inNotificationForAMsg"
script="OnNotificationsScript">
<field name="ID" type="string" array="false"/>
<field name="param1" type="data" component="Notification"
array="false"/>
</message>
<message name="outSubscribeForAMsg" >
<field name="body" type="data" component="NotificationFilter1"
array="false"/>
</message>
<message name="inDeleteSubscriptionAMsg"
script="OnSubscriptionEndScript">
<field name="ID" type="string" array="false"/>
<field name="reason" type="string" array="false"/>
</message>
<screen name="SendSubscriptionScreen" dialog="false" layout="vertical"
title="Send Subscription">
<!-- -->
<button name="Subscribe Button" inValue="Subscribe">
<onClick transition="SubscribeScript" />
</button>
<menu/>
</screen>
<screen name="ReceivingNotificationsScreen" dialog="false"
layout="vertical" title="Receiving Notifications">
<!-- -->
</screen>
<script name="SubscribeScript"/>
<script name="OnNotificationsScript"/>
<script name="OnSubscriptionEndScript"/>
</mobileApp>
```

The systems and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A system comprising:
an application gateway comprising:
an application repository publishing a notification-based application bundle, the notification-based application bundle being based on a Web service interface of a backend server, and conforming to a notification protocol; the notification-based application bundle being further referred to by a registry entry in an application registry;
an event source accepting a subscription, delivering a notification and terminating the subscription; and
a proxy server implementing the notification protocol and communicating with the backend server synchronously and a wireless device asynchronously;
wherein the wireless device initiates an application download from the application gateway; and wherein the proxy server receives the notification-based application bundle from the application repository.

2. The system of claim 1, wherein the wireless device generates application subscribe message for the proxy server.

3. A method of enabling communication between a mobile device and a backend server, the method comprising:
- generating a Web service interface of the backend server, the Web service interface conforming to a notification protocol;
- creating a notification-based application bundle based on the Web service interface;
- publishing the notification-based application bundle in an application repository of an application gateway;
- publishing a registry entry in an application registry, the registry entry referring to the notification-based application bundle;
- implementing an event source for accepting a subscription synchronously from the mobile device, delivering a notification and terminating the subscription; and
- triggering the notification asynchronously when data changes pertaining to the mobile device are detected at the backend server.

4. The method of claim 3, further comprising
- initiating, at the mobile device, an application download from the application gateway; and
- receiving, at a mobile proxy server in the application gateway, the notification-based application bundle from the application repository.

5. The method of claim 3, further comprising:
- generating, at the mobile device, an application subscribe message for the proxy server.

6. The method of claim 3, further comprising:
- creating a proxy on the application gateway to implement the notification protocol.

7. The method of claim 3, wherein the event source is implemented according to a protocol supported by an application gateway server.

8. The method of claim 3, further comprising forwarding a notification from the event source in a form appropriate for the wireless device.

9. A non-transitory computer-readable medium storing instructions or statements for use in the execution in a computer of a method of enabling communication between a mobile device and a backend server, the method comprising:
- generating a Web service interface of the backend server, the Web service interface conforming to a notification protocol;
- creating a notification-based application bundle based on the Web service interface;
- publishing the notification-based application bundle in an application repository;
- publishing a registry entry in an application registry, the registry entry referring to the notification-based application bundle;
- implementing an event source for accepting a subscription synchronously from the mobile device, delivering a notification and terminating the subscription; and
- triggering the notification asynchronously when data changes pertaining to the mobile device are detected at the backend server.

10. The non-transitory computer-readable medium of claim 9, wherein the method further comprises:
- initiating, at the mobile device, an application download from the application gateway; and
- receiving, at a mobile proxy server in the application gateway, the notification-based application bundle from the application repository.

* * * * *